March 17, 1931.  C. G. PREIS  1,796,766
HEAT CONTROL SYSTEM
Filed March 23, 1928
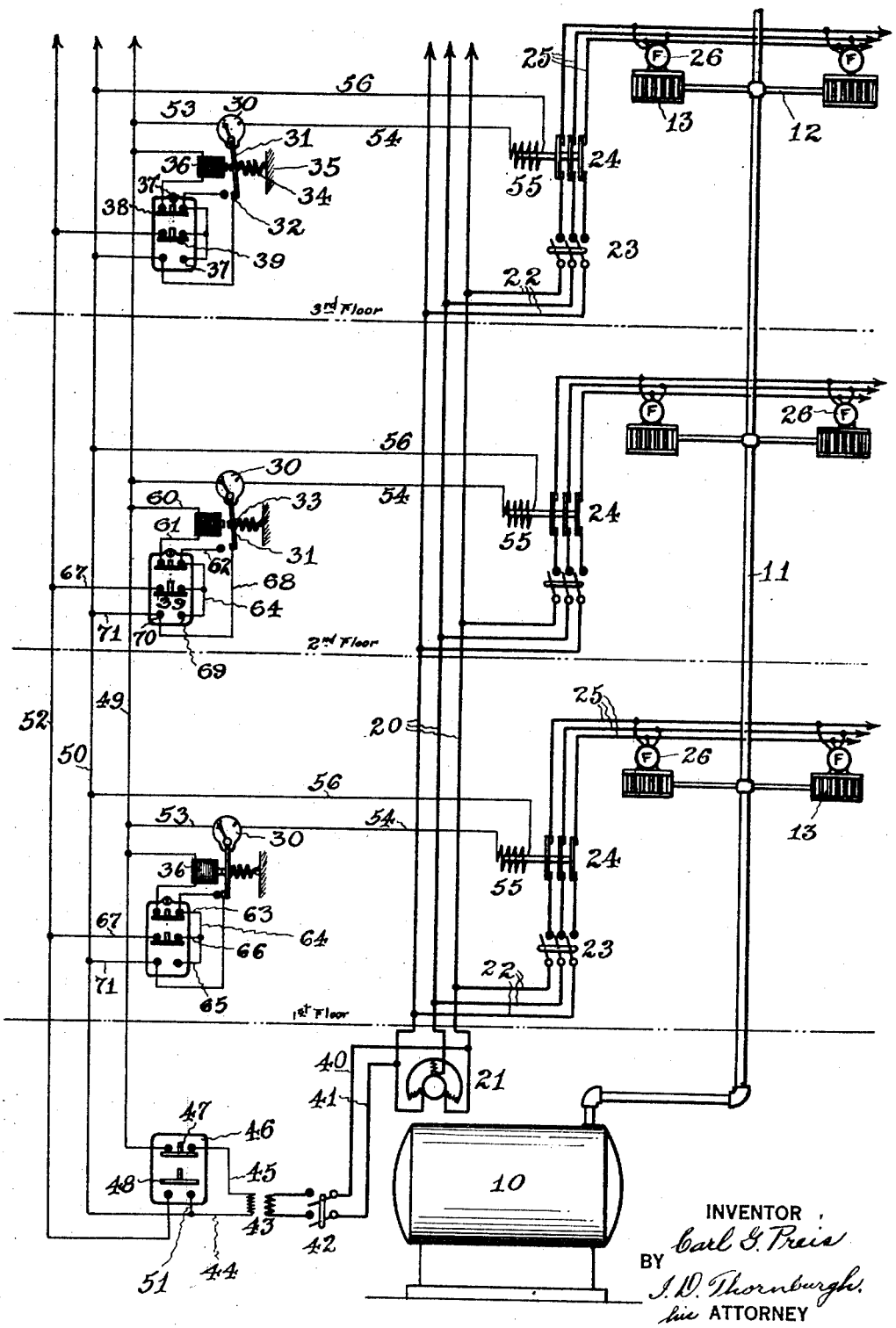
INVENTOR
Carl G. Preis
BY
J. D. Thornburgh
his ATTORNEY Patented Mar. 17, 1931

1,796,766

UNITED STATES PATENT OFFICE

CARL G. PREIS, OF LYNBROOK, NEW YORK

HEAT-CONTROL SYSTEM

Application filed March 23, 1928. Serial No. 264,097.

My invention relates to a dual type control system whereby automatic heat regulation is maintained at different locations according to predetermined temperature settings manually operated from a common control station.

While my invention has varied applications to the control of heat, it is particularly well adapted to modern factory conditions wherein various departments are more or less separated and often disposed on different floors in one or more buildings. In supplying heat to such a factory there is preferably a single source of heat supply, located, for example, in the boiler-room of the factory, and it is desirable that the temperature throughout the various departments, floors, or rooms of the building or buildings be automatically maintained constant for given periods of time but at the same time be under the control of the engineer in the boiler-room.

My present invention relates to a thermostatic control system by which thermostats with two temperature controls are arranged in the different locations. In my copending application Serial Number 264,098, filed March 23, 1928, I set forth a control system using two distinct thermostats, there being conditions where a single thermostat with two temperature controls is not desirable.

Each thermostat of my present invention is set to maintain at any given time one of two predetermined temperatures, one setting being used for daytime or maximum temperature, and the other for nighttime or minimum temperature. Provision is made for placing either the daytime or nighttime thermostatic control in operative condition, this being regulated from the boiler-room of the factory.

My invention also contemplates heat distributing or heat radiating elements connected with the source of heat supply, which supply may be in the form of radiators positioned in suitable locations throughout the factory. A number of these radiators can be controlled by one thermostat, as, for example, where one thermostat influences all or part of the radiators on one floor or in one department of the factory.

I contemplate as regards the heating medium, any manner of heat distribution or heat radiation. Control of heat radiation can be accomplished through the medium of a heat radiating element such as a valve connected with the heat supply and associated with each radiator, or control of heat distribution can be accomplished through the medium of heat distributing elements such as electric motors when used with an air circulating heating system employing a fan or other instrument to distribute the heat radiated from the radiators. These heat distributing or heat radiating elements as the case may be are directly controlled electrically by connection with thermostatic units associated with that particular group of elements.

While there are many adaptations of the general principle of my invention, I have disclosed in the drawing, by way of illustration, one improved form adapted for use in a modern factory. Reference should now be had to the drawing.

The drawing illustrates more or less diagrammatically the different features of my invention, and discloses a wiring system well adapted to carry out the spirit thereof.

The numeral 10 designates any suitable source of heat such as may be obtained, for example, from a steam boiler. This heat is distributed throughout the building by means of the header or heat main 11, to which is connected individual radiators 13. As indicated in the drawings these radiators can be suitably placed in different locations on various floors of a factory building or in any other desirable manner. Pipes 12 connect with each radiator.

I have disclosed in the drawings a primary or main electrical three-wire circuit 20, carrying electrical energy produced in any suitable manner, as for example by the three-phase generator 21. Individual three-wire leads connected at suitable points with the main wiring 20 comprise wires 22 passing through a three-pole service switch 23 at each division or location throughout the factory. Wires 22 after passing through the switch 23 are connected to one side of suitable relays 24 adapted to make or break the current passing therethrough in a manner which will be hereinafter more fully described. Wires 25 are connected to the opposite side of the relays 24 and constitute the individual leads for electrical energy passing to the various heat distributing or heat radiating elements designated at 26, there being an element 26 associated with each radiator 13.

In the event that a fan is used as a heat distributing element 26, to raise the room temperature it is only necessary to operate the fan in order to distribute heat radiated by the radiator 13. This is operated automatically by means of my thermostatic control if the temperature within the region surrounding such radiator falls below the predetermined temperature as set on the thermostat. I have disclosed in the drawing a system for operating the fan 26 when electrical energy passes through the lead lines 25. It should be evident that it would be equally satisfactory to provide a valve of a solenoid or other well known electrical principle, by which heat passing into the radiator 13 would be properly controlled. In the first case, that is by means of a fan, the room is heated by moving the air currents warmed by the radiator, while in the second example, whereby a valve controls the radiator, direct radiation is used.

At a suitable control point, such point for example being in the boiler-room of the factory, I provide an electric circuit carried by the wires 40 and 41 which receive their energy from the main electrical leads 20, these wires passing through a two-pole service switch 42 which connects with wires forming the primary of a transformer 43. The secondary wiring of the transformer 43 consists of wires 44 and 45 and these constitute the source of electrical energy for the thermostatic control system. This system makes use of thermostatic units comprising any one of a number of well known types of thermostats together with associated auxiliary electrical circuits utilizing make-and-break contacts and an electro-magnet for maintaining certain operating conditions at certain periods as will now be fully described.

The thermostats 30 are positioned in any suitable location and may be of any standard type having a setting arm or lever for changing the temperature setting. As such a thermostatic heat regulating unit is well known in the art it is thought that further description of the thermostat is unnecessary. In using the thermostat 30 in my present invention I provide a lever 31 which may be an extension of the regular temperature setting arm or otherwise connected therewith in any suitable manner. Said lever 31 carries, at its lower extremity, a contact 32 and, intermediate its length, an armature 33. A coil spring 34 is interposed between the lever 31 and a fixed point 35 and tends to normally hold the lever 31 with its armature 33 out of contact with the core of an electromagnet 36. As will be more fully explained this normal position of the lever 31 is equivalent to manually moving the setting arm of the thermostat to minimum or nighttime temperature. When the lever 31 is in such position the thermostat will control the operation of the heat distributing elements 26 to maintain a constant nighttime temperature in the factory.

The electro-magnet 36 is used to hold the lever 31 in a position corresponding to a setting of the thermostat 30 for a maximum or daytime temperature. This changing of temperature setting from a normal low to a high, or vice versa, can be accomplished at each individual thermostat or all thermostats can be thrown on maximum or minimum temperature operation from a common remote control point, as for example, in the boiler-room. These operations will now be explained in detail.

The wire 45 constituting one lead of the control circuit passing from the transformer 43 enters a master control switch box 46 conveniently located in the boiler-room, the said wire passing to one contact post of a push button switch 47 of the momentary circuit breaker type. The other contact post of the said switch 47 is connected with a wire 49 constituting one lead of the thermostatic control circuit and extending throughout the factory in proximity to the various thermostats.

The wire 44 is connected directly to a wire 50 the latter constituting another lead of the thermostatic control circuit, this wire 50 also extending throughout the factory. A shunt wire 51 connects the wire 44, (at its juncture with the wire 50) to one contact post of a push button switch 48 of the momentary circuit closing type. This switch 48 is also in the switch box 46. The other contact post of the switch 48 is connected with a wire 52 also extending parallel with the lead wires 49 and 50.

As long as the switch 47 is closed, and it is closed at all times except at the momentary breaking of the circuit by reason of manual operation on its push button, electrical energy is present in the wires 49 and 50. It should be understood that this applies when service switch 42 is closed as this service switch 42 is provided for the purpose of completely shutting off all operation on the thermostatic control system. Each thermostat is electrically connected with the lead wires 49 and 50 by means of wire 53 connected with the wire 49, and wire 54, coil 55, (for operating the relay 24) and wire 56 leading back to the wire 50. By this arrangement, therefore, when the mechanism of the thermostat 30 operates in the regular well known manner to make an electrical connection between wires 53 and 54, coil 55 is energized and relay 24 closes the main circuit through wires 25 and energizes the heat distributing elements 26 associated therewith, as previously described. It should be understood that this takes place independent of whether the setting arm of the thermostat 30 is on maximum or minimum temperature. The relay 24 holds the circuit through wires 25 closed only as long as the coil 55 is energized. When the coil is de-energized by action of the thermostat, when the room temperature reaches the proper point, the circuit is broken and the distributing element 26 stops operation.

I will now describe the mechanism for keeping or changing the lever 31 of the thermostat 30 on its high or low temperature setting. Referring to each thermostatic unit, which comprises a thermostat 30, an electromagnet 36 and a switch box 37 containing two switches 38 and 39, it should be observed that wire 60 connects one side of the electro-magnet 36 with the lead wire 49. The other side of the magnet 36 is connected by wire 61 to one contact post of the switch 38. The switch 38 is of the momentary circuit-breaker type, that is, the switch is normally closed at all times except when manually held open by pressure on the push button connected therewith.

The other contact post of the switch 38 is connected by a wire 63 to wire 64. Wire 62 also connects with the same contact post and leads to a contact adjacent the contact 32 carried by the lever 31 of the thermostat 30. Wire 66 connects wire 64 with one contact post of the switch 39. This switch 39 is identical in construction with switch 38 and its opposite contact post is connected by wire 67 to the lead wire 52.

The contact 32 carried on the lever 31 is at all times directly connected to wire 68 which leads to a contact post 70 in the switch box 37 and said post in turn is connected by a wire 71 to the lead wire 50. Wire 64 is joined to wire 65 which is fastened to the contact post 69 opposite the post 70. Contact posts 69 and 70 are electrically and momentarily joined when the switch 39 is moved to break the contact between wires 66 and 67 for a purpose hereinafter described.

The switch box 37 is preferably of the lock switch type wherein manipulation of either switch 38 or 39 is prevented except by the use of a proper key inserted in the lock 37'.

By means of the described mechanisms the control of heat under the four following conditions is possible. First, a daytime or maximum temperature can be set up throughout the entire factory and at all locations by the operation of the switch 48 in the boiler-room.

Second, a nighttime or minimum temperature can be set up throughout the entire factory and at all locations by the operation of the switch 47 in the boiler-room. In both of these cases the setting imposed thereby on all thermostats will remain until changed by the operation of a boiler-room or individual thermostat switch. Third, if all of the thermostats are set for controlling minimum temperature any individual location control can be changed to high temperature by the operation of switch 39 connected with the individual thermostat 30 of that particular location. Fourth, if all of the thermostats are set for controlling maximum temperature any individual location control can be changed to low temperature by the operation of switch 38 connected with the individual thermostat 30 of that particular location.

In the first instance with the operation of switch 48 electric current flowing from one side of the transformer 43 through the wire 45 passes through the closed switch 47, wire 49, and into each thermostatic unit through the wire 60, electro-magnet 36, wire 61, switch 38, wires 63, 64 and 66, switch 39, wires 67 and 52 through the switch 48, wires 51 and 44, back to the other side of the transformer 43. This is only a momentary circuit since releasing the switch 48 will break the connection between the wires 51 and 52, but it is sufficient to energize the magnet 36 which, acting through the armature 33, draws the lever 31 toward the left as illustrated in the drawing, against the tension of spring 34 and this position places the contact 32 against the contact at the end of wire 62. The current thereupon immediately flows from the switch 38 through wires 62 and 68 to the contact post 70 and thence through wire 71 to the lead wire 50. In other words, immediately upon the operation of the switch 48 and the energizing of the magnet 36 the current passing into the switch 38 divides into the wires 62 and 63 and the current passing back by way of the wires 50 and 44 keeps the magnet 36 energized and wires 62 and 68 connected. It is therefore immaterial whether switch 48 is held closed or whether it is allowed to automatically open. As long as an electro-magnet 36 of any thermostatic unit is energized the lever 31 of that unit will be held in the maximum temperature position.

In the second instance when nighttime temperature control is to go into operation a momentary opening of the switch 47 disconnects the current flowing through the various magnets 36 and the spring 34 connected with each thermostat 30 throws each lever 31 toward the right as illustrated in the drawing and sets all thermostats on low or minimum temperature. This operation forms a check against carelessness and insures against any particular location control being left at a high setting beyond the time that high temperature is needed.

The third instant is to take care of a condition when one or more departments are required to operate at night or at a time when the rest of the factory is not running. At such a time, since none of the magnets 36 are energized, all thermostats 30 are set for low temperature and are controlling the heating elements through the coils 55 and relays 24 in the regular manner. To change the setting at any particular location switch 39 is operated to momentarily connect the contact posts 69 and 70 in the switch box 37 of that location. Current thereupon flows into wire 60, magnet 36, wire 61, through switch 38, wires 63, 64 and 65, contact post 69, through switch 39, contact post 70, wire 71 into wire 50. Since wires 49 and 50 at such times are carrying an electric current magnet 36 is energized and the lever 31 is moved to electrically connect wires 62 and 68 whereupon the current will divide at switch 38 and some current will pass through the wires 62 and 68 to the contact post 70 and thence through wire 71 to the lead wire 50.

The switch 39 when released will break the connection between the contact posts 69 and 70 but the current flowing by way of the wires 62 and 68 will maintain the magnet 36 energized and the thermostat 30 set at high temperature control. When the work of that particular department is completed the nighttime setting is restored by operation of the switch 38 which de-energizes magnet 36 and allows the spring 34 to move the lever 31 to normal position.

It should be understood that this individual placing of the thermostat 30 on high temperature control or disconnecting after such setting in now way affects the other thermostatic control units. Should the operator fail to change the setting after the overtime period only the single location would remain at a higher heat than necessary and this would be for only the interval of time until the next boiler-room change period.

The fourth instance cited is to provide for the closing of one department and placing it on minimum temperature control when the remainder of the factory is in operation. Under such circumstances since the magnet 36 at that particular department is energized as by operation of the remote control switch 48 as previously described, it is merely necessary to operate the individual switch 38 and de-energize the magnet 36 which will allow spring 34 to move the lever 31 to minimum temperature control.

By the above description it should thus be evident that I have provided a flexible temperature control system whereby the switches of all of the thermostats may be set for either maximum or minimum temperature, this being done from a remote control point. Under working conditions this change of temperature setting will take place when the factory starts operation in the morning and when working is terminated in the evening. Independently of this master control any individual location can regulate its own setting. At each setting for minimum temperature through the master control switch all thermostatic units are set for minimum and remain so until changed collectively or individually.

The two predetermined heat temperature ranges on each thermostat can in themselves be fixed at any point depending on the distance between the contact 32 and the contact post at the end of wire 62 or on the position of the latter point. After such a maximum and a minimum temperature has been determined the automatic individual and collective control will take place as described on one or the other setting. Thus for example if one location regularly required less maximum temperature than another, proper setting of the individual thermostat range could be made and this would in no way affect the operation of the system as described or the setting of other thermostatic units.

I claim:

1. A dual heat control system comprising, in combination, a source of heating energy, a plurality of heat radiators, a heat controlling element associated with each radiator, a source of electrical energy, a primary circuit and a secondary circuit connected with the electrical energy, relays disposed in the primary circuit for operating the heat controlling elements, thermostats disposed in the secondary circuit for operating the relays of the primary circuit, and a thermostatic control system embodied in the secondary circuit for changing and maintaining temperature settings on the thermostats, said thermostatic control system comprising two sets of switches, one set being a remote control consisting of a high temperature and a low temperature switch, the other set being an individual thermostat control also consisting of a high temperature and a low temperature switch, both sets of switches independently operating through portions of the secondary circuit to change the temperature settings on each thermostat.

2. In a dual heat control system, the combination of a source of heating energy, a heat radiator, a heat controlling element associated therewith, a primary electrical circuit passing through the heat controlling element, a relay in said circuit for opening and closing the circuit, a secondary electrical circuit, a thermostatic temperature control unit having electrical connection with said secondary circuit and with said relay for actuating the relay and by means of the primary circuit thereby operating said heat controlling element the thermostatic temperature control unit having a high and a low temperature setting, means connected with said secondary electrical circuit for imposing the high temperature setting on said control unit, and a magnet circuit electrically connecting said unit with said secondary circuit for maintaining the high temperature setting.

3. In a dual heat control system, the combination of a source of heating energy, a heat radiator, a heat controlling element associated therewith, a primary electrical circuit passing through the heat controlling element, a relay in said circuit for opening and closing the circuit, a secondary electrical circuit, a thermostatic temperature control unit having electrical connection with said secondary circuit and with said relay for actuating the relay and by means of the primary circuit thereby operating said heat controlling element the thermostatic temperature control unit having a high and a low temperature setting, means connected with said secondary electrical circuit for establishing the high temperature setting on said control unit, a magnet circuit electrically connecting said unit with said secondary circuit for maintaining the high temperature setting, and means independent of said establishing means for opening said magnet circuit to restore the control unit to its low temperature setting.

4. In a dual heat control system, the combination of a source of heating energy, heat radiators, heat controlling elements associated therewith, a primary electrical circuit passing through the heat controlling elements, relays in said circuit for opening and closing the circuit, a secondary electrical circuit, thermostatic temperature control units having electrical connection with said secondary circuit and with said relay for actuating the relays and by means of the primary circuit thereby operating said heat controlling elements each thermostatic temperature control unit having a high and a low temperature setting, collective means associated with said secondary circuit for simultaneously establishing high temperature settings on all thermostatic units, individual means also associated with said secondary circuit for establishing a high temperature setting on each thermostatic unit, and a magnet circuit for maintaining the high temperature setting, on each unit irrespective of its establishment for closing said magnet circuit.

5. In a dual heat control system, the combination of a source of heating energy, a heat radiator, a heat controlling element associated therewith, a primary electrical circuit passing through the heat controlling element, a relay in said circuit for opening and closing the same, a secondary electrical circuit, a thermostatic temperature control unit having electrical connection with said secondary circuit and with said relay for actuating the relay and by means of the primary circuit thereby operating said heat controlling element the thermostatic temperature control unit having a high and a low temperature setting, devices for holding said unit at its low temperature setting, electrical means operable at a point removed from said unit for overcoming said devices and establishing a high temperature setting on said unit, a magnet circuit electrically connecting said unit with said secondary circuit for holding the high temperature setting on said unit, and means at said unit for opening and closing the magnet circuit.

6. In a dual heat control system, the combination of a source of heating energy, a heat radiator, a heat controlling element associated therewith, a primary electrical circuit passing through the heat controlling element, a relay in said circuit for opening and closing the same, a secondary electrical circuit, a thermostatic temperature control unit having electrical connection with said secondary circuit and with said relay for actuating the relay and by means of the primary circuit thereby operating said heat controlling element the thermostatic temperature control unit having a high and a low temperature setting, devices for holding said unit at its low temperature setting, electrical means operable at a point removed from said unit for overcoming said holding devices and imposing the high temperature setting on said unit, a magnetic circuit associated with said unit for holding said imposed temperature setting, means at said unit, and independent means at a remote point for independently opening the magnet circuit.

7. In a duel heat control system, the combination of a source of heating energy and a source of electrical energy, heat radiators connected with said heating energy, a heat controlling element associated with each radiator, a thermostatic temperature control unit connected with said electrical energy for operating said heat controlling elements, said thermostatic unit comprising a thermostat having an arm adapted for movement into one of two positions, one position constituting a high temperature setting, the other position a low temperature setting, an electrical contact member carried by said arm, means for normally holding said contact member in circuit breaking position with said arm on its low temperature setting, and a magnet circuit including said contact connecting said unit with said electrical energy for holding said contact in circuit closing position while maintaining the high temperature setting of said arm.

8. In a dual heat control system, the combination of a source of heating energy and a source of electrical energy, heat radiators connected with said heating energy, a heat controlling element associated with each radiator, a thermostatic temperature control unit connected with said electrical energy for operating said heat controlling elements, said thermostatic unit comprising a thermostat having an arm adapted for movement into one of two positions, one position constituting a high temperature setting, the other position a low temperature setting, an electrical contact member carried by said arm, means for normally holding said contact member in circuit breaking position with said arm on its low temperature setting, a magnet circuit including said contact connecting said unit with said electrical energy for holding said contact in circuit closing position while maintaining the high temperature setting of said arm, and a switch for momentarily breaking said magnet circuit whereby said holding means moves said contact member into circuit breaking position preventing reestablishment of said magnet circuit by reclosing of said switch.

CARL G. PREIS.